United States Patent [19]
Karasudani

[11] 4,044,864
[45] Aug. 30, 1977

[54] DISC BRAKE

[75] Inventor: Yasuo Karasudani, Yokohama, Japan

[73] Assignee: Tokico Ltd., Japan

[21] Appl. No.: 701,606

[22] Filed: July 1, 1976

[30] Foreign Application Priority Data

July 17, 1975  Japan .................................. 50-87598

[51] Int. Cl.² ............................................. F16D 65/02
[52] U.S. Cl. .................................................. 188/73.3
[58] Field of Search ..................... 188/73.1, 73.3–73.6, 188/72.4, 72.5

[56] References Cited
U.S. PATENT DOCUMENTS

| 3,708,043 | 1/1973 | Rath et al. | 188/73.3 |
| 3,920,104 | 11/1975 | Hoffmann | 188/73.3 |
| 3,924,711 | 12/1975 | Hoffmann et al. | 188/73.3 |

Primary Examiner—Duane A. Reger
Attorney, Agent, or Firm—Wenderoth, Lind & Ponack

[57] ABSTRACT

A disc brake has a supporting member secured to a non-rotatable part of a vehicle and two arms spaced circumferentially relative to the disc for guiding a pair of friction pad assemblies therebetween, the friction pad assemblies being engaged with the arms in a manner such that, in applying the brake, braking drag is received by the two arms when the drag exceeds a predetermined amount 2 Claims, 3 Drawing Figures

DISC BRAKE

This invention relates to disc brakes, and more particularly to the improvements in retaining friction pads on a stationary supporting member.

One of the known type of disc brakes has a construction as shown in FIGS. 1 and 2.

In FIGS. 1 and 2, a disc 1 shown by a double dotted chain line rotates together with an axle 1'. A supporting member 2 consisting of circumferentially spaced arms 3 and 4, a beam portion 5 and guide portions 6 and 7 is mounted on a non-rotatable part of a vehicle (not shown), such as a spindle knuckle of a suspension strut or the like by bolts 8 and 9. A caliper housing 10 is retained by bolts 15 and 16 on pins 13 and 14 which are slidably fitted in guide holes 11 and 12 provided in the supporting member 2, the housing 10 being slidable in the direction of the axis of the disc 1 or the axle 1'.

Within the caliper housing 10, there is provided a cylinder 17, in which an actuating piston 18 is slidably fitted. The cylinder 17 has an inlet port for introducing pressurized liquid from a source of pressurized liquid (not shown) into the cylinder 17. Designated by 20 are friction pad assemblies each of which comprises a backing plate 21 and friction material 22.

When pressurized liquid is introduced into the cylinder 17 through the port 19, the piston 18 acts on one friction pad assembly directly against one surface of the disc 1, while the caliper housing 10 is moved by reaction in the direction of arrow C in FIG. 2 with the pins 13 and 14 sliding within the guide holes 11 and 12 respectively, whereby the other friction pad assembly 20 is urged against the opposite surface of the disc 1 whereby braking action is effected. When the disc 1 is rotating in the direction of arrow A in FIG. 1, a bending moment F will be produced in the supporting member 2 around the bolt 8. The bending moment F acts to produce a bending moment F' in the beam portion 5 of the supporting member 2, with the accompanying risk of causing cracks in the beam portion 5 the dimension of which is restricted due to the requirements which must be satisfied in mounting the brake on the vehicle. Because of the risk of the cracks, the dimension of the beam portion 5 cannot be reduced to a desired amount, and thus it becomes difficult to install the brake in a small space.

It is accordingly an object of the present invention to provide a disc brake wherein the bending moment acting in the beam portion of a supporting member is minimized, thereby avoiding cracks or rupture of the beam portion as well as improving the ease of mounting the brake in the vehicle, and wherein a less expensive material may be used for the supporting member.

The object and other features of the present invention will be apparent from the following description taken in conjunction with the drawings, in which.

Figure 1:
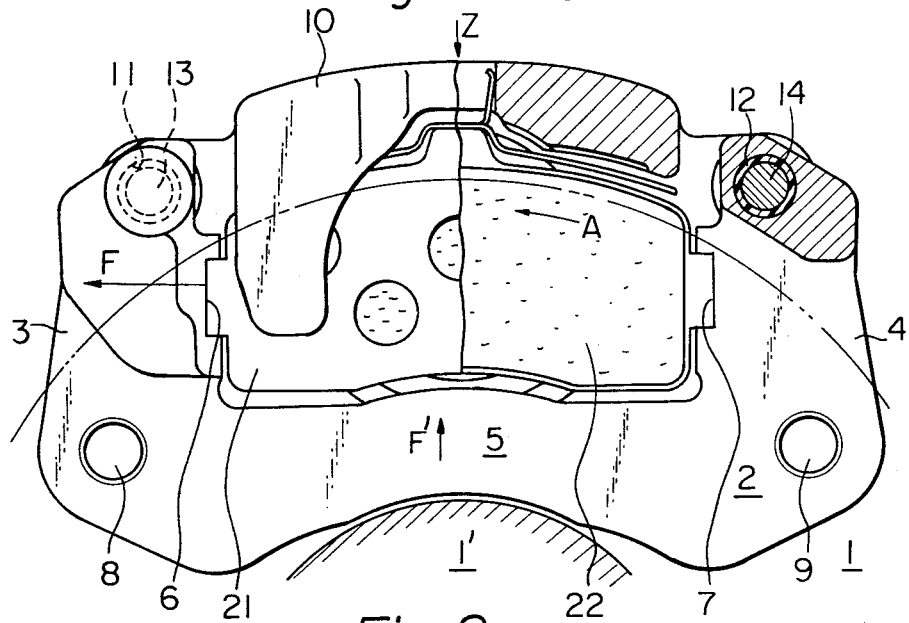
FIG. 1 is a partially broken away front view of one of the prior art disc brakes of the floating calliper type.
Figure 2:
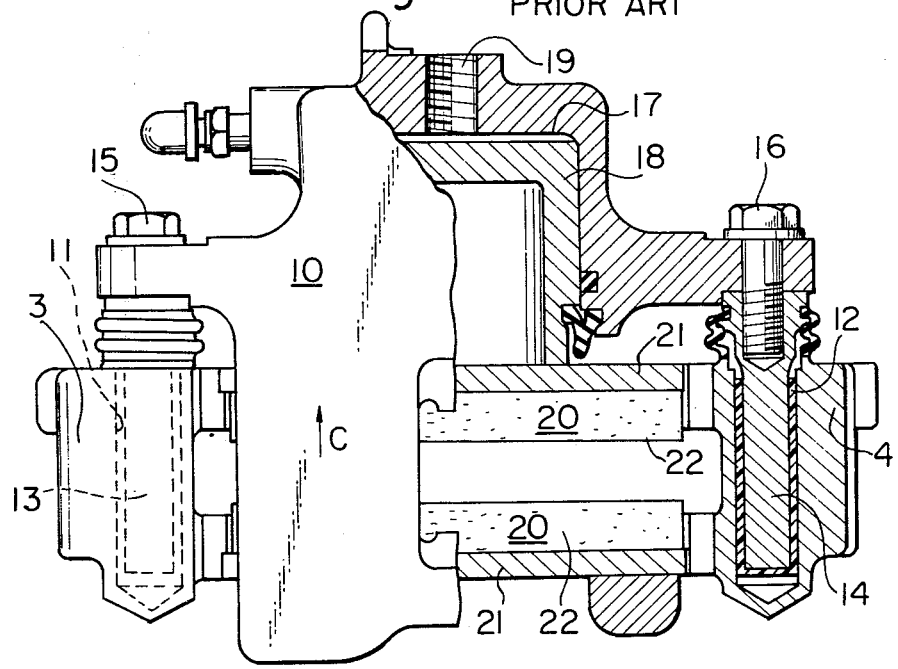
FIG. 2 is a partially broken away view taken in the direction of arrow Z in FIG. 1.
Figure 3:
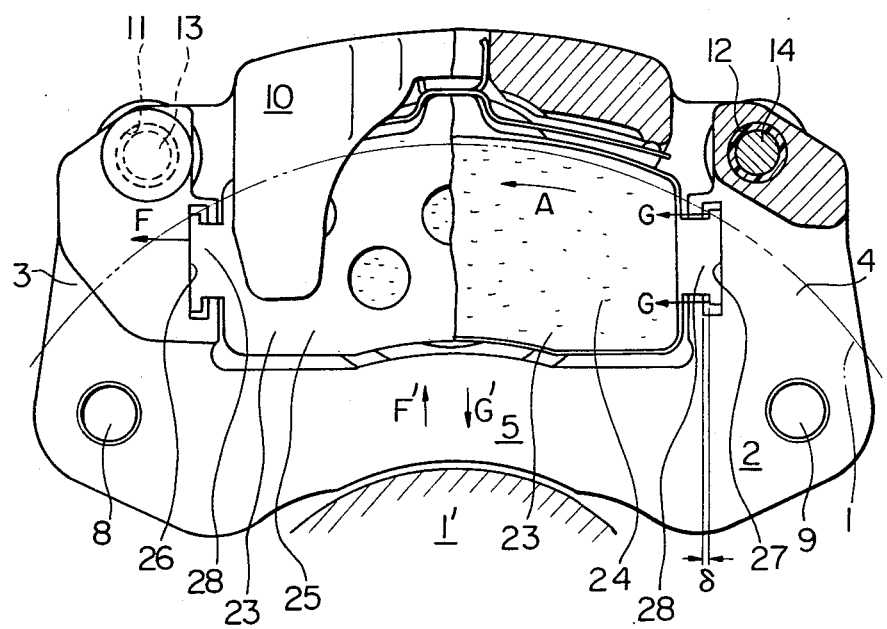
FIG. 3 is a partially broken away front view of a disc brake according to the present invention.

The disc brake according to the present invention shown in FIG. 3 has a construction and operation generally similar to that of the disc brake shown in FIGS. 1 and 2 and components corresponding to those in FIGS. 1 and 2 are indicated by identical reference numerals.

In FIG. 3, each of friction the pad assemblies is composed of a backing plate 25 and a friction material 24, and is disposed in a position opposed to one of the opposite surfaces of the disc 1 which is shown by a double dotted chain line. Guide grooves 26 and 27 having a T-shaped cross-sectional shape are provided in the arms 3 and 4 of the supporting member 2 for guiding the axial movement of the friction pad assemblies.

The backing plate 25 has a T-shaped projection 28 on each end thereof slidably engaged in the guide grooves 26 and 27 for sliding movement in the direction of the axis of the disc 1, the T-shaped projections 28 acting to limit the displacement of the friction pad assemblies 23 in the circumferential direction relative to the disc 1.

The T-shaped projections 28 are fitted in the guide grooves 26 and 27 with a clearance δ being left between a shoulder portion of the groove 27 and an inwardly facing shoulder portion of the projection 28 on the trailing side of the backing plate 25 when the projection 28 on the leading side abuts the bottom of the groove 26 as shown. The clearance δ may be on the order of 0.3–0.5mm.

When braking is applied to the disc 1 rotating in the direction of arrow A in FIG. 3, the arm 3 will receive a braking drag or the bending moment F as shown in the drawing which will tend to produce a moment F' in the beam portion 5, but the arm 3 will be deformed leftward as viewed in the drawing thus taking up the clearance 8, whereupon a portion of the bending moment F will come to act on the arm 4 through the projection 28 and the groove 27. The bending moment G acting on the arm 4 will produce bending moment G' in the beam portion 5 which has the direction opposite to that of the bending moment F', with the result that the bending stress caused in the beam portion 5 is greatly reduced.

In the foregoing description, the disc 1 is described as being rotated in the direction of arrow A, but the same effect will be produced when the disc is rotated in the opposite direction.

The embodiment shown has a clearance δ inwardly of the projections 28, but the clearance may be provided outwardly of the projections 28, in which case the arm 4 receives the braking drag first when the disc is rotating in the counterclockwise direction in FIG. 3.

Further, the engagement between the backing plates and the arms of the supporting member need not necessarily be T-shaped projections and complementary grooves as in described the embodiment. As an alternative, pins may be provided on two arms of the supporting member respectively, in a manner such that the friction pad assemblies are guided on the pins slidably with guide openings formed in the friction pad assemblies having a predetermined circumferential clearance therebetween, so that braking drag will be shared by the two pins when the drag exceeds a predetermined amount.

Further it is possible to arrange the clearance such that the braking drag is received by only one arm during a normal braking operation and the drag is received by two arms when an excessive force is applied such as when applying an emergency brake.

The disc brake having the construction described according to the present invention insures a satisfactory performance, with the freedom from cracking of the beam portion of the supporting member when it is given a reduced dimension for ease in mounting the brake on the vehicle, and a less expensive material (for example, ductile cast iron or grey cast iron) may be used to form the supporting member. Since the beam portion can be reduced in width, an improvement in ease of mounting the brake may be achieved. Further, the relative deformation between the arms can be controlled within a desired amount ($\delta$), and thus smooth movement of the pins 13 and 14 guiding the caliper can be attained.

In the foregoing, a description has given of a floating calliper type disc brake, but it will be noted that the present invention may be applied to disc brakes of other types such as a fixed calliper type having cylinders and pistons on the opposite sides of a rotatable disc.

What is claimed is:

1. A disc brake comprising a stationary supporting member for mounting on a non-rotatable part of a vehicle on one side of a rotatable brake disc, a pair of arms on said supporting member spaced in the direction of the circumference of the disc and extending axially from the supporting member and straddling a portion of the circumference of the disc, a pair of friction pad assemblies slidably engaged with said arms for sliding movement in the direction of the axis of the disc, and clamping means for urging the friction pad assemblies against the opposite surfaces of the disc, each of the friction pad assemblies having T-shaped projection means on each of the circumferential ends thereof, and said arms each having complementarily shaped grooves therein in which said projection means are slidable, whereby braking drag is received by both of said arms when the disc is rotating in either direction.

2. A disc brake according to claim 1 wherein there is a clearance between the T-shaped projection means and the grooves in the arms such that the arm on the trailing side relative to the rotational direction of the disc receives braking drag first when the clamping means is actuated and thereafter the arm on the leading side also receives a portion of the braking drag.

* * * * *